US008954790B2

(12) United States Patent
Rangarajan et al.

(10) Patent No.: US 8,954,790 B2
(45) Date of Patent: Feb. 10, 2015

(54) FAULT TOLERANCE OF MULTI-PROCESSOR SYSTEM WITH DISTRIBUTED CACHE

(75) Inventors: Thanunathan Rangarajan, Bangalore (IN); Baskaran Ganesan, Bangalore (IN); Binata Bhattacharayya, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 12/984,500

(22) Filed: Jan. 4, 2011

(65) Prior Publication Data

US 2012/0005524 A1 Jan. 5, 2012

(51) Int. Cl.
*G06F 11/00* (2006.01)
*G06F 11/16* (2006.01)
*G06F 12/08* (2006.01)
*G06F 11/20* (2006.01)

(52) U.S. Cl.
CPC ........ *G06F 11/1666* (2013.01); *G06F 11/1658* (2013.01); *G06F 12/0813* (2013.01); *G06F 12/0846* (2013.01); *G06F 11/20* (2013.01); *G06F 12/0864* (2013.01)
USPC ...................................................... 714/6.13

(58) Field of Classification Search
USPC ...................................................... 714/6.13
See application file for complete search history.

(56) References Cited

U.S. PATENT DOCUMENTS

| 5,123,101 | A | 6/1992 | Sindhu |
| 5,530,958 | A | 6/1996 | Agarwal |
| 7,058,773 | B1 * | 6/2006 | Frye et al. ..................... 711/162 |
| 7,533,300 | B2 | 5/2009 | Marisetty |
| 7,600,080 | B1 | 10/2009 | Bhattacharyya |
| 7,761,696 | B1 | 7/2010 | Bhattacharyya |
| 7,836,229 | B1 | 11/2010 | Singh |
| 8,578,138 | B2 | 11/2013 | Natu |
| 2002/0007402 | A1 * | 1/2002 | Thomas Huston et al. ... 709/217 |
| 2004/0215883 | A1 | 10/2004 | Bamford et al. |
| 2005/0005188 | A1 | 1/2005 | Hsu |
| 2006/0143384 | A1 | 6/2006 | Hughes |
| 2010/0064205 | A1 * | 3/2010 | Moyer .......................... 714/800 |
| 2010/0268984 | A1 * | 10/2010 | Guthrie et al. ................... 714/5 |
| 2011/0145501 | A1 * | 6/2011 | Steely et al. .................. 711/121 |

FOREIGN PATENT DOCUMENTS

TW 200636466 10/2006

OTHER PUBLICATIONS

Preliminary Examination—Office Action and Taiwan IPO Search Report from Foreign Counterpart Application No. 100122007, mailed Nov. 22, 2013, 30 pages including English Translation.
International Preliminary Report on Patentability and Written Opinion from PCT/US2011/041228, mailed Jan. 17, 2013, 6 pages.
International Search Report and Written Opinion, PCT/US2011/041228, mailed Jan. 2, 2012, 10 pages.

* cited by examiner

*Primary Examiner* — Scott Baderman
*Assistant Examiner* — Jigar Patel
(74) *Attorney, Agent, or Firm* — Blakely, Sokoloff, Taylor & Zafman LLP

(57) ABSTRACT

A semiconductor chip is described having different instances of cache agent logic circuitry for respective cache slices of a distributed cache. The semiconductor chip further includes hash engine logic circuitry comprising: hash logic circuitry to determine, based on an address, that a particular one of the cache slices is to receive a request having the address, and, a first input to receive notice of a failure event for the particular cache slice. The semiconductor chip also includes first circuitry to assign the address to another cache slice of the cache slices in response to the notice.

24 Claims, 9 Drawing Sheets

FAULT TOLERANCE OF MULTI-PROCESSOR SYSTEM WITH DISTRIBUTED CACHE

CLAIM TO PRIORITY

This application claims the benefit of India Patent Application No. 1573/DEL/2010, filed Jul. 5, 2010, entitled, "Fault Tolerance Of Multi-Processor System With Distributed Cache," which is hereby incorporated by reference in its entirety into this application.

FIELD OF INVENTION

The field of invention is related generally to electronic computing systems, and, more specifically, to the fault tolerance of a multi-processor system with a distributed cache.

BACKGROUND

A multi-processor computing system is a computing system having multiple processors that execute their own respective software program code. Multi-processor computing systems can be implemented in various ways, such as, with multiple discrete computers interconnected over a wide area network, or, to provide another example, a single computer whose processor chip includes multiple processing cores that independently execute their own respective software code. For simplicity, the present application may use the term "processor" when referring to a component that is technically a "processing core".

Multi-processor computing systems are often implemented with a shared cache. A shared cache is capable of receiving information (such as a cache line) to be cached from multiple processors within the computing system, and/or, is capable of providing cached information to multiple processors within the computing system. FIG. 1 shows a component of a prior art multi-processor computing system having each of the following on a single semiconductor chip and/or having each of the following integrated within a single electronic component package 100 (hereinafter, "socket"): 1) multiple processors 101_1 through 101_X; 2) cache "slices" 102_1 through 102_Y (notably, Y may equal X); 3) respective caching agents 103_1 through 103_Y for each of the cache slices; and, 4) a network 104 between the processors and the cache slices.

The socket also includes a gateway router function 105 between the socket's internal network 104, and, another external network 106 that the socket 100 may be connected to as part of a complete multi-processor computing system 107. Notably, the multi-processor computing system 107 may include additional sockets 108_1 through 108_Z, e.g., designed identically/similar to socket 100, to increase/scale the processing power of the multi-processor system 107. The multi-processor system 107 may also include other standard computing system components such as a system memory component 109 (which may include, for instance, a memory controller coupled to an RDRAM system memory), an I/O control hub component 110 (including potentially more than one of each of these components 109, 110), a graphics controller and/or display (not shown) such as an LED display or CRT display.

Each of processors 101_1 through 101_X may include its own respective, local cache (not depicted in FIG. 1). When a processor looks for an item of information in its local cache and a "miss" occurs (or, if the processors 101_1 through 101_X simply do not include their own respective local cache), one of the cache slices 102_1 through 102_Y is snooped for the desired information. The particular cache slice that is snooped is determined from the address of the information (e.g., the address of the desired cache line).

For instance, if a cache miss occurs at processor 101_1, a request is constructed for the desired cache line, and, hash engine logic circuitry 111 performs a hash function on the address to determine which cache slice is the appropriate cache slice for the particular address. The request is then directed over network 104 to the cache agent for the appropriate cache slice (e.g. cache agent 103_1 if cache slice 102_1 is the targeted slice). The cache agent snoops the targeted cache slice, and, if the desired cache line is found it is sent over network 104 to processor 101_1. If the desired cache line is not found, a request for the cache line is sent into network 106. Notably, the hashing function used by the hashing engine 111 may be designed to evenly spread the various addresses of the field of potential cache line addresses across the cache slices 102_1 through 102_Y. The set of cache slices 102_1 through 102_Y are sometimes collectively referred to as the "last level cache" (LLC) 112 because a failed snoop into the LLC 112 causes the desired information to be next sought for outside socket 100 rather than within socket 100.

A problem with the prior art socket 100 of FIG. 1 concerns the degradation and/or failure of one of the cache slices 102_1 through 102_Y. Specifically, as observed in FIG. 1, each of caching agents 103_1 through 103_Y includes respective Error Correction Code (ECC) logic 113_1 through 113_Y that is used to "fix" flaws in the information that is read from a cache slice. Besides performance degradation owing to time spent fixing data flaws, if a cache agent notices that its ECC is flagging information defects too frequently, it will raise a System Management Interrupt (SMI) and/or Machine Check Error (MCE) to inform high levels of system management 160 that a problem exists.

However, presently, there does not exist any design hooks/ features to prevent the degrading cache slice from being used further. The hash engine 111 will continue to target a cache slice, according to its internal hashing algorithm, that is degrading or has failed.

Prior art sockets have the ability to adjust the number of active processors and cache slices during manufacturing. Specifically, prior art sockets permit their respective cache slices to be tested during manufacturing, and, if one or more "bad" cache slices are detected, the socket can be permanently configured to enable fewer than all of the cache slices that the socket was manufactured with. However, once the socket is shipped after manufacturing, the number of enabled cache slices cannot be changed. As such, the socket can't, during runtime, dynamically change the number of cache slices to which cache lines will be dispersed.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
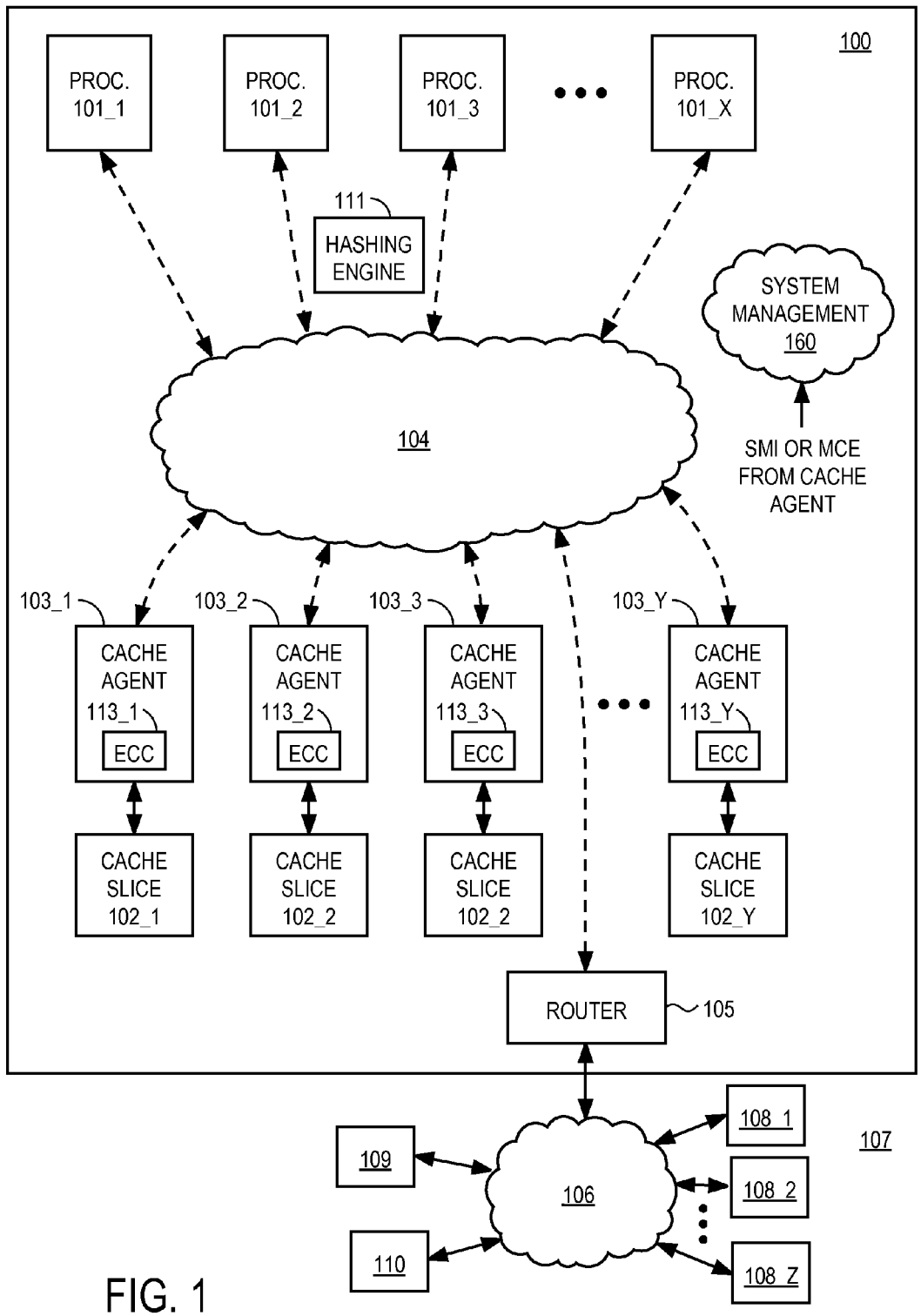
FIG. 1 shows a prior art socket for a multi-processor computing system.
Figure 2A:
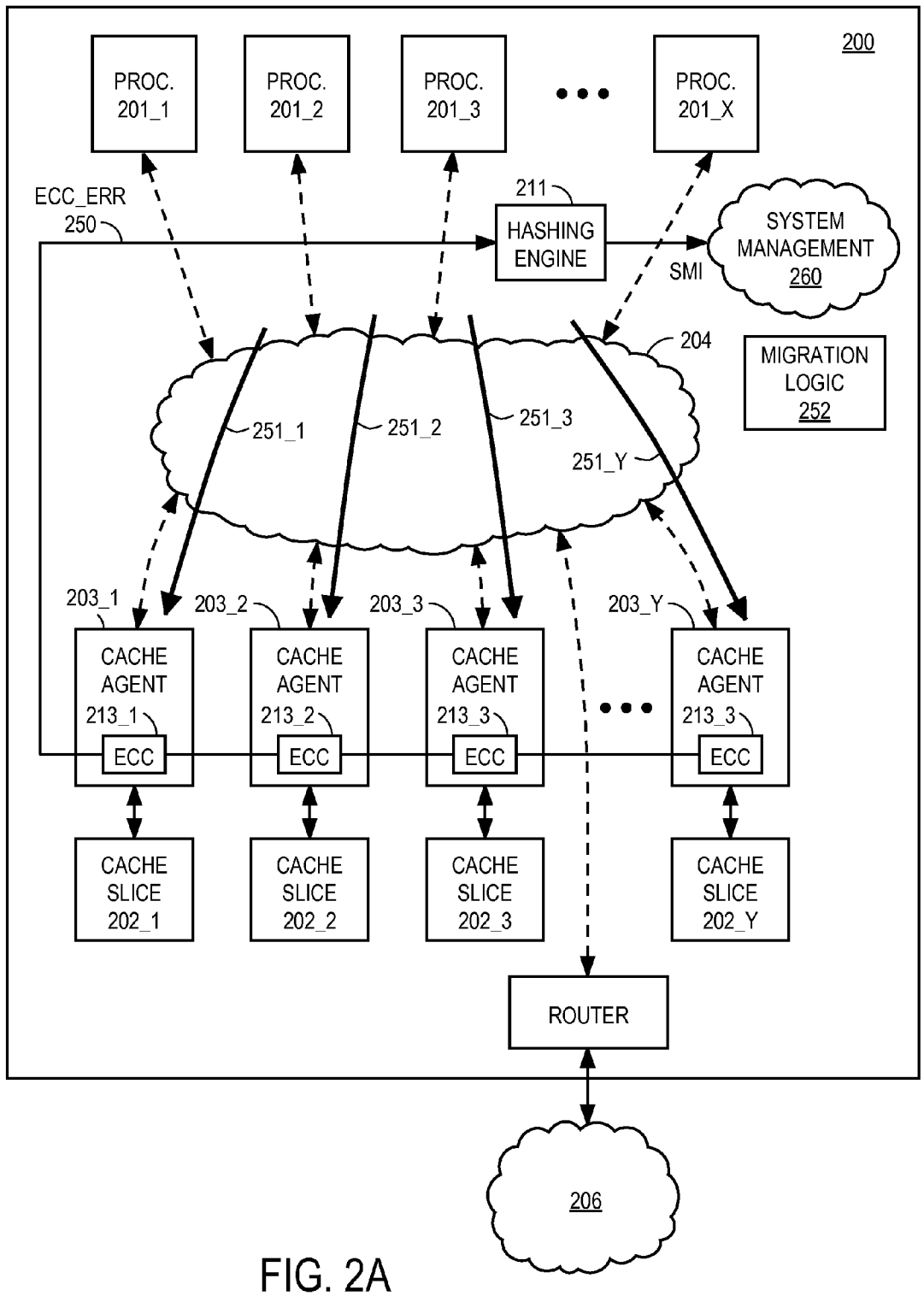
FIGS. 2a through 2c demonstrate an improved socket that can redirect LLC cache snoops, for cache lines whose respective addresses correspond to a failing or degraded cache slice, to another cache slice.
Figure 2B:
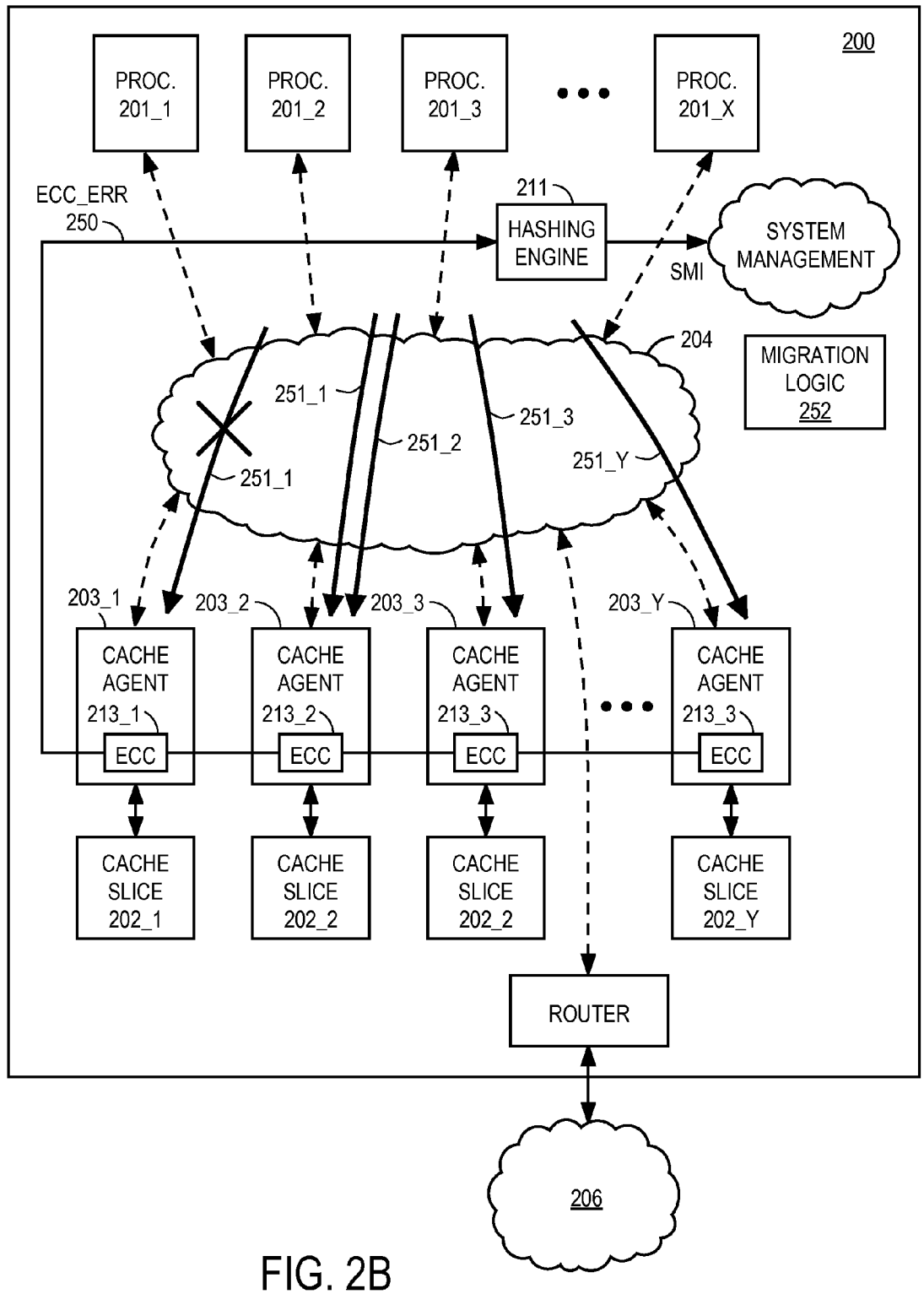
Figure 2C:
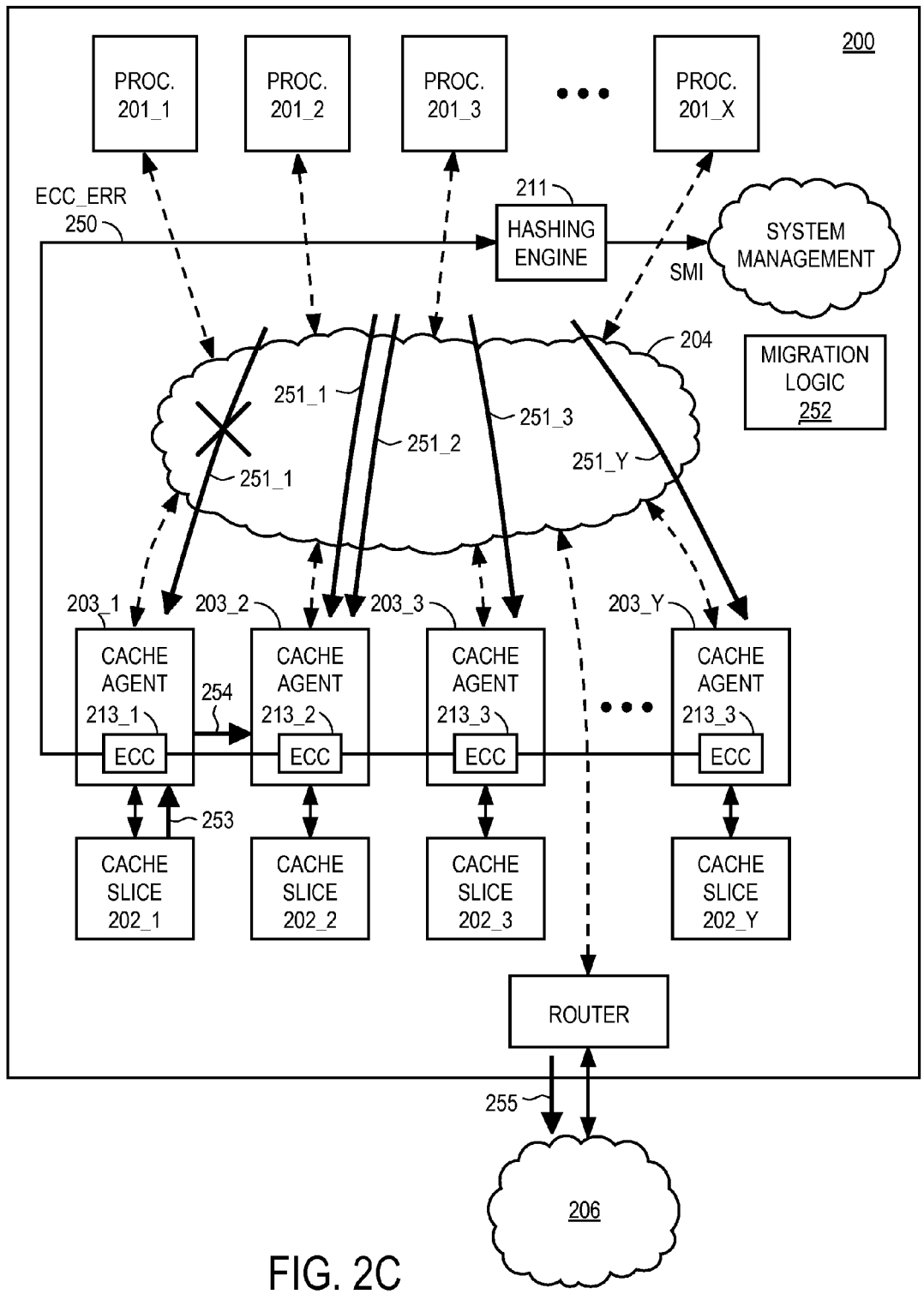

FIGS. 2a through 2c pertain to an improved socket 200 that redirects LLC cache snoops, for cache lines whose respective addresses correspond to a failing or degraded cache slice, to another cache slice.

FIG. 2a depicts the improved socket 200 prior to any cache slice failure. Here, "flows" of cache line snoop requests 251_1 through 251_Y are observed that extend through network 204 to respective cache agents 203_1 through 203_Y of cache slices 202_1 through 202_Y. The flows 251_1 through 251_Y are meant to depict the set of cache line addresses that cause the hashing function within the hashing engine 211 to target a particular cache slice. That is, flow 251_1 corresponds to the set of cache line addresses that cause the hashing function to target cache slice 202_1; flow 251_2 corresponds to the set of cache line addresses that cause the hashing function to target cache slice 202_2; etc.

According to the operation of the improved socket, when a cache agent detects that its corresponding cache slice is failing or has failed ("failure event"), the cache agent sends notice (ECC_ERR 250) of the problem to the hashing engine 211. As an example, assume that cache slice 202_1 is failing. As a consequence, the ECC logic 213_1 of cache agent 203_1 (upon processing information read from cache slice 202_1) will flag too many errors (e.g., over time, over the amount of information read, etc.). As such, a threshold is crossed which causes cache agent 203_1 to send notice of the event 250 to the hashing engine 211.

In response to the received notice 250, as observed in FIG. 2b, the hashing engine 211 is reconfigured such that its internal hashing function redirects cache line addresses that were originally being directed to cache slice 202_1 (i.e., the failing cache slice) to another, properly working cache slice. For the sake of example, assume that cache slice 202_2 is the newly appointed cache slice that will receive cache lines whose addresses originally caused them to be directed to cache slice 202_1. FIG. 2b attempts to depict the reconfiguration of the hashing engine 211 by showing the redirection of the corresponding "flow" 251_1 from cache slice 201_1 to cache slice 201_2.

The improved socket 200 may also take further system recovery steps. Specifically, even though cache slice 201_1 is deemed to be failing, it may still contain valid data. As such, as observed in FIG. 2c, migration logic 252 is responsible for causing such data to be read 253 from cache slice 201_1 and stored 254 in the newly appointed cache slice 201_2, or, in an alternative approach, flushed 255 to system memory. In a further embodiment, only data that is identified as being in the modified (M) state is migrated 254/255 from the failed cache slice 202_1. According to an embodiment, in the case where migration is effected by flushing the cache lines from the failing/failed cache slice to system memory, the cache agent of the failing/failed cache slice issues Explicit WriteBack (EWB) operations into external network 206 for the cache lines being migrated.

Figure 3:
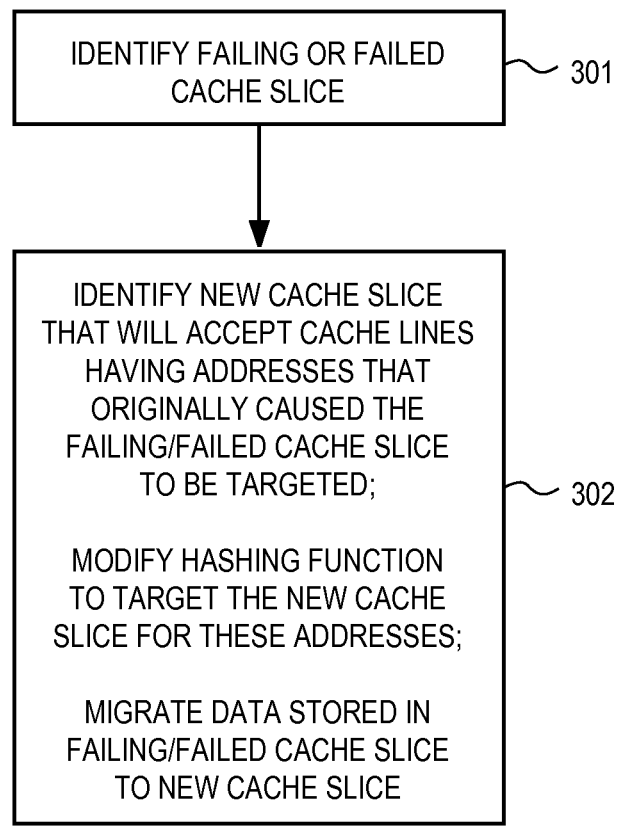
FIG. 3 shows a methodology that can be performed by the improved socket of FIGS. 2a through 2c.

FIG. 3 shows a methodology performed by the improved socket design of FIGS. 2a through 2c. According to the methodology of FIG. 3, a failing or failed cache slice is identified 301. In response to the recognition 301 of the failing/failed cache slice the following is performed: a new cache slice is identified for the cache lines whose respective addresses caused the original hashing function to direct them to the failed cache slice; the hashing function of the hashing engine 211 is modified to cause cache lines having these addresses to be directed to the new cache slice; and, data stored in the failing/failed cache slice is migrated to the new cache slice or system memory 302 (notably, according to various possible approaches, the act of modifying the hash function may effectively identify the new cache slice).

Before explaining more detailed embodiments a few implementation notes are worth mentioning. Firstly, the various logic components of the improved socket (such as each of the processors 201_1 through 201_X, the hashing engine 211, the migration logic 252, the internal network 204, the cache agents 203_1 through 203_Y, the router/gateway 205) may be implemented with electronic logic circuitry such as the types of circuitry typically associated with complementary logic circuits implemented on a semiconductor chip. Likewise, the cache slices 202_1 through 202_Y may be substantially implemented with electronic storage circuitry such as the types of circuitry typically associated with Static Random Access Memory (SRAM) cells or Dynamic Random Access Memory (DRAM) cells.

In an embodiment, network 204 is implemented with a ring architecture that includes at least two oppositely directed rings. Here, each processor may have its own associated access to the rings and an outgoing request is placed on the ring having the shortest path to the request's destination. Alternatively, access to the network 204 from the processors may be accomplished at a single point of access. Network 204 may alternatively take on various other topological forms besides ring (e.g., full mesh, nodal hop, shared media bus, etc.).

In an embodiment, as depicted in FIGS. 2a through 2c, the hashing engine 211 is implemented in a centralized fashion such that cache slice snoop requests generated by any of the multiple processors 201_1 through 201_X are processed by the same hashing engine 211 to determine the target cache slice. Alternatively, the hashing engine 211 may be implemented in a distributed fashion. For example, each processor may have its own dedicated hashing engine for determining the target cache slice for the cache slice snoop requests that it generates. In this case, notice of a failing cache slice should be broadcast to each hashing engine instance, and, in response, each hashing engine instance should be designed to determine the same new cache slice for the affected cache line addresses and implement the same hashing algorithm modification.

In a further embodiment, the caching agents are capable of issuing a System Management Interrupt (SMI) and/or Machine Check Error (MCE). Moreover, the hashing engine 211 may also be designed to issue an SMI and/or MCE. In the case of a failing/failed cache slice, the cache agent for the failing/failed cache slice is apt to detect additional operational errors concerning the cache slice, and, flood the system with MCIs and/or MCEs. As such, according to one embodiment, when the hashing engine receives notice of the failing/failed cache slice 250, the hashing engine will not only identify a new cache slice for the affected addresses and modify its internal hashing algorithm, but also, the hashing engine will issue an SMI. System management 260 (such as system firmware and/or BIOS) receives the SMI and, in response, partially or wholly "shuts down" the cache slice and/or its respective cache agent by, for instance, stripping the cache agent of its ability to issue additional SMIs and MCEs.

In an alternative socket design embodiment, instead of the hashing engine 211 choosing the new cache slice and modifying the hashing algorithm in response to notice 250 of the defective cache slice, system management 260 (in response to receipt of an SMI from the hashing engine 211 or from the caching agent of the failing/failed cache slice) chooses the new cache slice and/or determines the hashing engine modification. System management 260 may be implemented in various ways such as firmware, software, hardware or any combination thereof. Moreover "system management" may be a firmware/software and/or hardware instance that manages system level operation of the socket only, or, a larger part of the computing system as a whole. Depending on designer choice, system management 260 may be implemented wholly on the socket, partially on the socket or entirely off of the socket.

Figure 4:
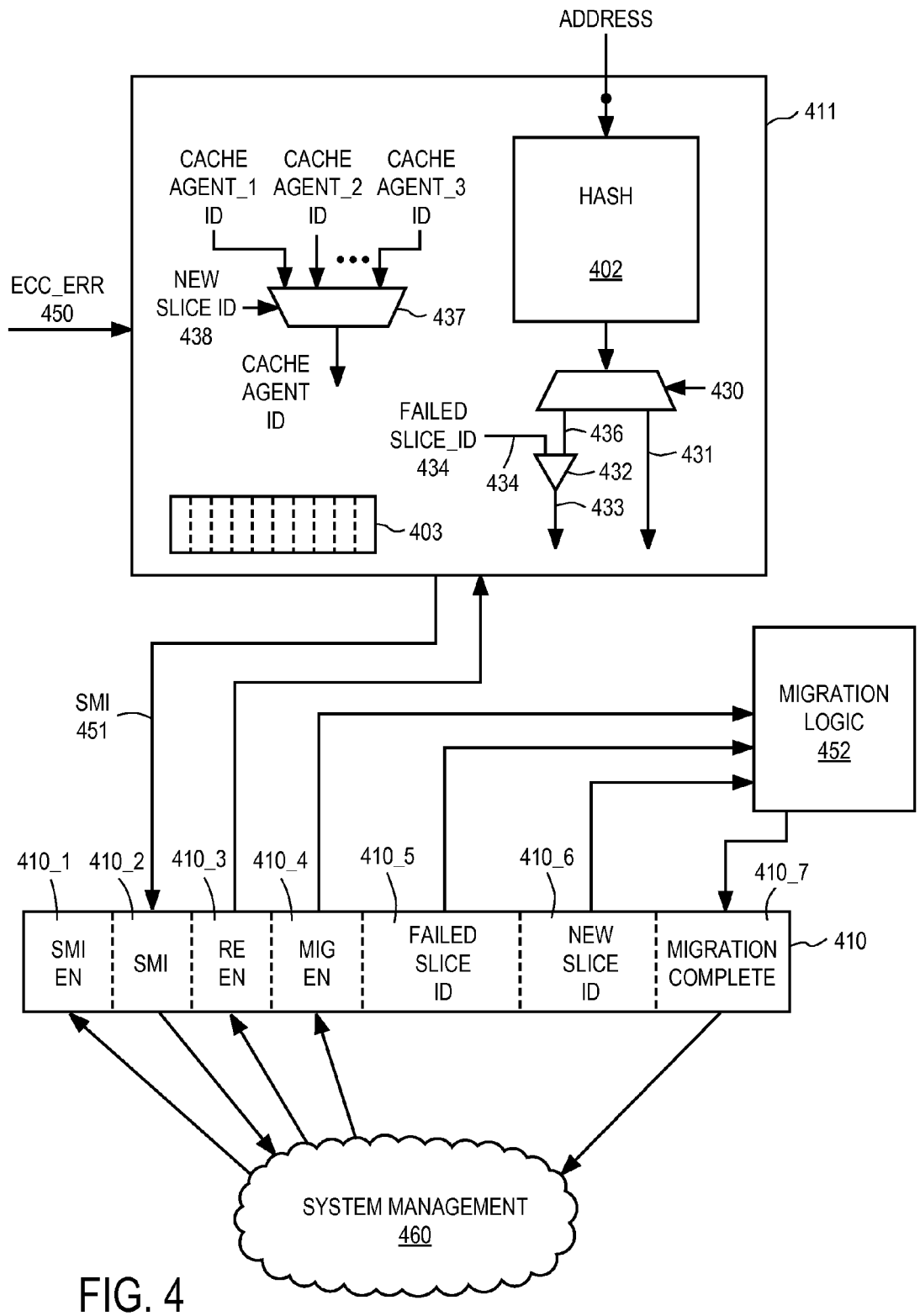
FIG. 4 shows an embodiment of a hardware/firmware interface and hashing engine design that may be implemented within the improved socket of FIGS. 2a through 2c.

FIG. 4 shows an embodiment of a hardware/firmware interface 410 and hashing engine 411 that may be used in the improved socket design described herein. For simplicity the term "hardware/firmware" is employed but it may more generally be characterized as a "hardware/system management" interface. As observed in FIG. 4, the hashing engine includes nominal hash engine logic circuitry 411, rehash engine logic circuitry 402 and address latches 403 for holding the address of a cache line (and upon which a hash is performed to determine a target cache slice). During normal operation, prior to any cache slice failure, all addresses are hashed by the nominal hash engine logic circuitry 401.

The first register 410_1 of the hardware/firmware interface 410, when set by system management 460, enables the hashing engine logic circuitry 411 to issue an SMI 451 (or other equivalent error notification) when it receives notice 450 that a cache slice is failing or has failed. The second register 410_2 is the SMI bit that is read by system management 460 to understand that a cache slice has failed. As described previously, in alternative embodiments, the SMI 451 may be set by other socket components (such as the cache agent/ECC of the failing/failed cache slice), thus, bit 410_1 may be utilized by other socket hardware components besides the hashing engine logic circuitry 411.

The third register 410_3 of the hardware/firmware interface 410 is set by system management 460 and enables the hashing engine 411 to reconfigure itself to: 1) directed addresses to their new target cache agent; and, 2) leave the target cache agent of unaffected addresses unchanged. In an embodiment, this bit 410_3 is set by system management 460 after system management 460 has imposed a quiesce state in response to the detection of the SMI in register 410_2.

FIG. 4 shows an embodiment of the hashing engine 411. Nominally (e.g., before any cache slice failure), hash logic 402 is used to determine the target cache slice for all addresses received by the hash engine 411. In this case, DEMUX input 430 is set to a state that corresponds to all cache slices are working, and, as such, all target IDs calculated by hash logic 402 flow from DEMUX/hash engine output 431.

After a failing/failed cache slice has been identified, however, DEMUX input 430 changes to a state that corresponds to a non working cache slice. All received addresses are initially processed by hash logic 411 and resulting cache slice target IDs flow from output 436 into comparator logic 432. Here, comparator logic 432 has a second input 434 that is set to a value that identifies the failed cache slice. In an embodiment, second input 434 is set by register 410_5 which is described in more detail further below. Cache slice target IDs received from input 436 that do not correspond to the failed cache slice are permitted to flow from the hash engine output 433. As such, the same cache slice target ID is produced for all addresses that are not affected by the failed cache slice.

Cache slice target IDs that correspond to the failed cache slice, however, are recomputed through MUX 437. Here, MUX input 438 corresponds to a state that identifies the new target cache ID for the affected addresses. As such, the new cache slice ID for all affected addresses flow through the MUX 437 output whose value is set to their new cache agent. In an embodiment, MUX input 438 is set from register 410_6 which is described in more detail further below.

In an embodiment, a nominal hash calculation produces both a TAG value and a cache slice ID value. For example, bits [2:0] of the hash 402 output correspond to the target cache slice ID value, and, bits [25:0] of the hash output 402 correspond to the TAG value. A TAG value in combination with a cache slice ID value can uniquely identify any cache line across the distributed cache slices. The MUX 437 observed in FIG. 4 only provides the cache slice ID value for affected addresses. According to one approach, hash logic circuitry 402 may still be used for affected addresses to generate the TAG value (or portion thereof). Alternatively, two levels of hashing are designed into the hash engine 411. A first hash level receives the physical address and hashes it to generate a first level of hash information. Then, a second level hash is performed on the first level hash information to generate the TAG value. The second level hash operates according to a first equation when the all cache slices are operational and a second, different, hash equation is used when one of the cache slices fails.

Notably, the hash logic 402 may be implemented as dedicated logic circuitry or controller/micro-controller logic circuitry that executes program code to effect the correct hashing algorithms.

The fourth register 410_4 of the hardware/firmware interface 410 enables migration as described above. As such, when system management 460 sets this bit, upon notice of the failing/failed cache slice, the migration logic circuitry 452 looks to this bit and, if set, begins the process of controlling the migration of data from the failed cache slice to the new cache slice. If the fourth register 410_4 is not set, data is flushed from the failed/failing cache slice to system memory as described above.

The fifth register 410_5 of the hardware/firmware interface 410 contains the identification of the failing/failed cache slice. This information may be set by hardware or system management 460 (e.g., by identifying which cache agent/ECC raised the error notification 450). Referring briefly back to the migration logic circuitry 452, in an embodiment, when the migration logic circuitry 452 is notified of a failing/failed cache slice, the migration logic circuitry 452 looks to the fourth register 410_4 to see if it is set, and, upon detecting that the fourth register is set 410_4, looks to the fifth register 410_5 to understand from which cache slice data is to be migrated. If the fourth register 410_4 is not set, the migration logic circuitry 542 or other logic circuitry looks to the fifth register 410_5 to cause data within the identified cache slice to be flushed to system memory.

The sixth register 410_6 is the identity of the new cache slice that addresses affected by the cache slice failure are to be directed to. This information is set by whichever entity determines the new cache slice such as hardware or software/firmware (such as management 460). Continuing with the example of the migration logic 452, if the fourth register 410_4 is set, the migration logic 452 also looks to the sixth register 410_6 to understand to which cache slice data is to be migrated to.

The seventh register 410_7 is a migration complete bit. The migration logic 452 sets this bit when migration is complete.

Figure 5:
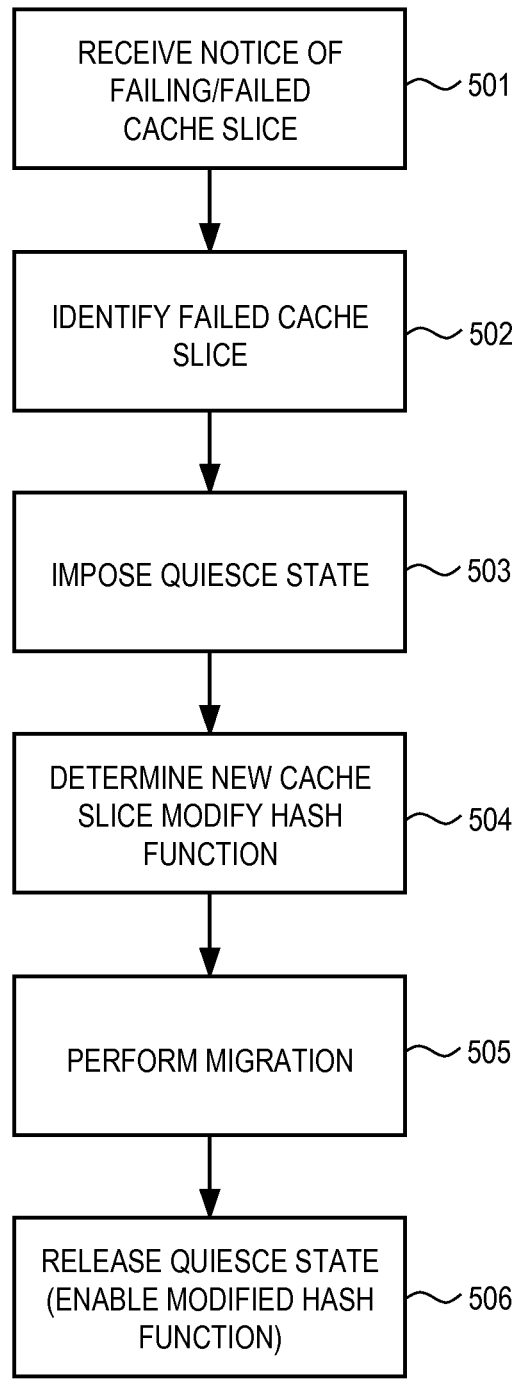
FIG. 5 shows a system recovery method that may be performed by the improved socket of FIGS. 2a through 2c.

FIG. 5 shows an error recovery process that can be executed by the improved socket hardware and/or system management. According to the process of FIG. 5, initially, notice of a failing/failed cache slice is received 501 (e.g., by the setting of bit 410_2). The failed cache slice is then identified 502 (e.g., by system management polling the cache agents, bit 410_5, which identifies the failed cache slice, may also be set). A quiesce state is then imposed 503 (e.g., by system management 460) which may include disabling the ability of the failing/failed cache slice's cache agent to issue additional SMI or MCE events and/or suspending further cache snoops to any cache slice so that the hash function modification can be made.

The new cache slice for the affected addresses is then identified 504. As discussed above, system management 460 or hardware may perform this operation and subsequently set the identity of the new cache slice in register 410_6.

The migration process is then performed 505. As described above, according to one embodiment, the system (such as migration logic 452 or elsewhere) looks to register 410_4 to understand if migration into the new slice is to be attempted. That is, if bit 410_4 is set, the migration logic 452 looks to register 410_5 to identify the failed cache slice and register 410_6 to identify the new cache slice. With this knowledge, the migration logic 452 then causes cache lines stored in the failing/failed device to be migrated to the new cache slice. If bit 410_4 is not set, the cache lines in the failed/failing slice are flushed to system memory.

In an alternative embodiment, migration logic 452 is implemented as execution logic within the cache agents (or other logic that can be associated with individual cache slices). When the new cache slice is identified executable recovery code used to perform the migration is loaded into the execution logic associated with the newly chosen cache slice. Execution of the recovery code causes a lookup into register 410_5 to understand the identity of the failed cache slice. The code also looks to register 410_4 to see if migration is enabled. If so, the code causes the data to be moved from the failed cache slice into the newly appointed cache slice. If not, the code causes the data to be flushed to system memory. Notably, in a further alternate embodiment, execution logic that is not associated with the new slice may also operate as described above with the exception that the register 410_6 is utilized and looked to determine where the migrated cache lines are to be moved to.

When migration is complete (either by logic 452 or recovery code) register 410_7 is set. Upon complete migration, the rehash engine is enabled by setting bit 410_3 and the quiesce mode is exited 506. Thereafter, snoop requests are permitted to go forward.

Figure 6:
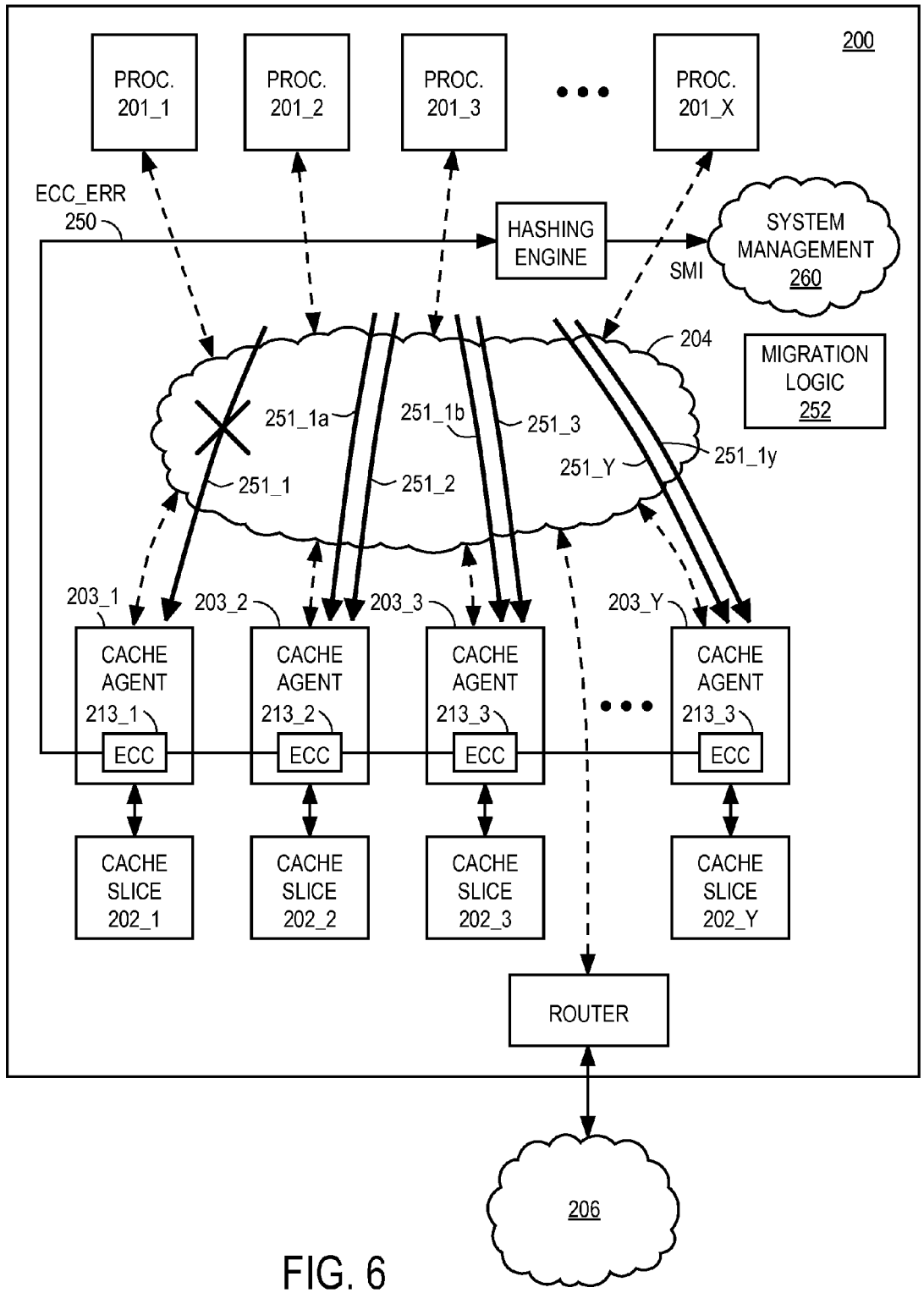
FIG. 6 shows another embodiment of an improved socket that can redirect LLC cache snoops.

FIG. 6 shows another socket embodiment that responds somewhat differently that the socket design discussed in FIGS. 2a through 2c. Whereas the socket of FIGS. 2a through 2c identifies a single working slice to accept all cache line addresses affected by a failed cache slice, by contrast, the socket approach of FIG. 6 distributes affected addresses across multiple (e.g., all remaining working) cache slices. FIG. 6 attempts to depict this characteristic by showing the original flow 251_1 of addresses to the failing/failed cache slice being redistributed as flows 251_1a through 251_1y.

In the case of the approach of FIG. 6, note that migration of the cache lines stored within the failing/failed slice 202_1 across the remaining cache slices 202_2 through 202_Y is more challenging than the approach of FIGS. 2a through 2c because the correct new target should be separately identified for each cache line within the failed cache (e.g., by recalculating a new target for the address of each cache line stored with the failed cache).

Figure 7:
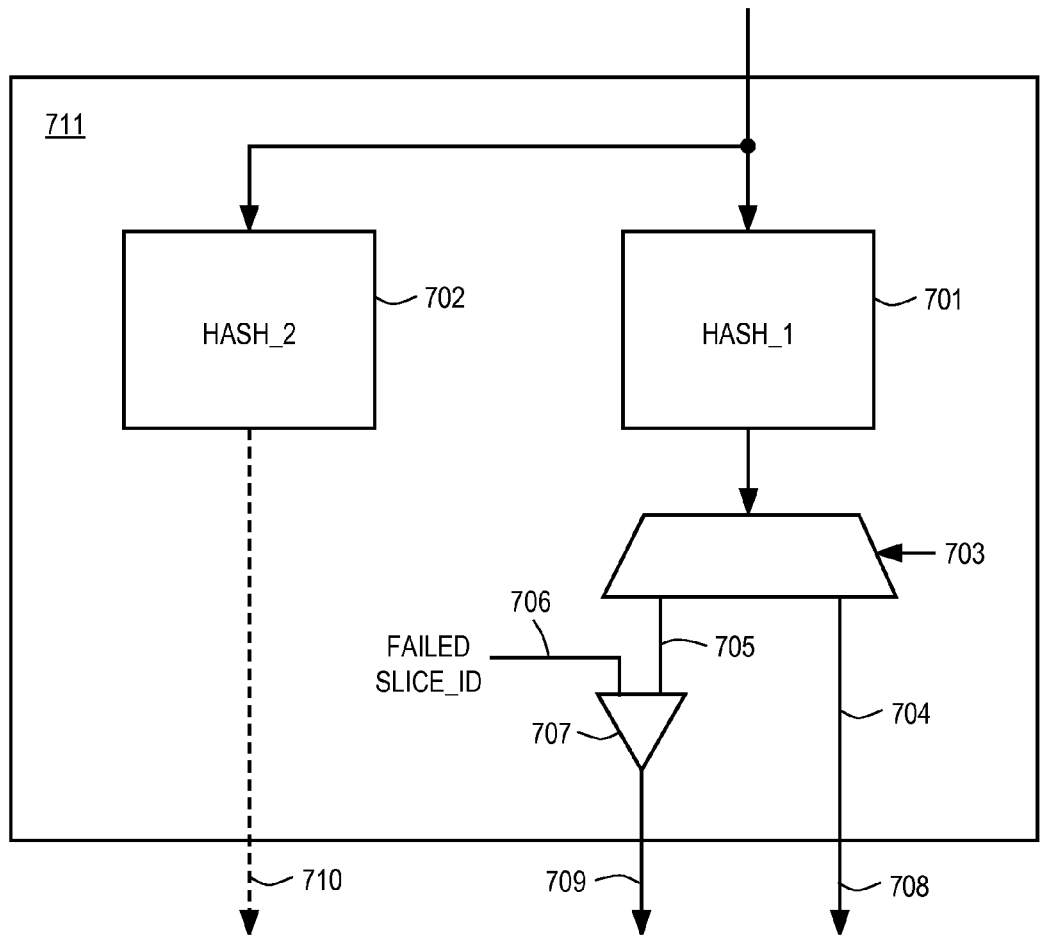
FIG. 7 shows an embodiment of a hashing engine design that supports the type of socket operation that is observed in FIG. 6.

FIG. 7 shows an embodiment of a hashing engine that supports the operation of the socket described just above in FIG. 6. Nominally (e.g., before any cache slice failure), hash logic 701 is used to determine the target cache slice for all addresses received by the hash engine 711. In this case, DEMUX input 703 is set to a state that corresponds to all cache slices are working, and, as such, all target IDs calculated by hash logic 701 flow from DEMUX output 704 to hash engine output 708.

After a failing/failed cache slice has been identified, however, DEMUX input 703 changes to a state that corresponds to a non working cache slice. All received addresses are initially processed by hash logic 701 and resulting cache slice target IDs flow from output 705 into comparator logic 707. Here, comparator logic has a second input 706 that is set to a value that identifies the failed cache slice. Cache slice target IDs received from input 705 that do not correspond to the failed cache slice are permitted to flow from the hash engine output 709. As such, the same cache slice target ID is produced for all addresses that are not affected by the failed cache slice.

Cache slice target IDs that correspond to the failed cache slice, however, are rehashed by second hash logic 702. Second hash logic 702 is different than first hash logic 701 such that different target IDs (and, depending in implementation, TAG values) are typically produced for the same address value input. As such, typically, the rehash from second hash logic 702 will produce a different target ID than that of the failed cache slice. As such, these target IDs are permitted to flow from the hash engine output 710. The output from second hash logic 702 may be intercepted by similar/same comparison circuitry 707 to flag any target IDs produced by the second hash 702. According to one embodiment, a chain of third, fourth, fifth, etc. hash logic blocks (not shown), each being different from the other, are included in the hash engine 711 and the process repeats until a target ID that does not correspond to the failing/failed cache slice is produced. If the last additional hash logic block in the chain (even if the chain is 2 as observed in FIG. 7) still produces the target ID of the failing/failed cache slice, the cache line for the address that produced this result is simply sent to system memory rather than being cached. The hashing engine 711 will therefore produce repeatable results that: 1) do not change the target ID of unaffected addresses; and, 2) at least substantially change the target ID of affected addresses. The migration logic circuitry is coupled to the second 702, third, etc, hash circuits to determine the new respective target slice for each cached item within the failed/failing slice.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A semiconductor chip, comprising:
different instances of cache agent logic circuitry for respective cache slices of a distributed cache;
hash engine logic circuitry comprising:
hash logic circuitry to determine, based on an address, that a particular one of said cache slices is to receive a request having said address;
a first input to receive notice of a failure event for said particular cache slice;
first circuitry to assign said address to another cache slice of said cache slices in response to said notice; and
migration logic circuitry to move, in response to said notice, cached information whose location within said particular cache slice is to be specified by said address from said particular cache slice to said another cache slice if a migration bit is enabled and flush said cached information to a system memory if said migration bit is not enabled.

2. The semiconductor chip of claim 1 comprising a network between said different instances of cache agent logic circuitry and said hash engine logic circuitry.

3. The semiconductor chip of claim 1 wherein said migration logic circuitry is coupled to said first circuitry, said first circuitry being second hash logic circuitry.

4. The semiconductor chip of claim 1 wherein said first circuitry is coupled to a register that receives an identity of said another cache slice from firmware or software that determines, in response to said notice of said failure event, that said another cache slice is an appropriate new cache slice for addresses targeted to said particular one of said cache slices.

5. The semiconductor chip of claim 1 further comprising a register coupled to said hash engine logic circuitry to store at least one of
an identity of said particular one of said cache slices; and
an identity of said another cache slice.

6. The semiconductor chip of claim 1 wherein said migration logic circuitry is to move said cached information evenly across a plurality of said another cache slices.

7. A method, comprising:
receiving a request having an address for an item of information;
hashing said address to determine a particular cache slice amongst a plurality of cache slices within a distributed cache that is to be targeted for said request;
sending said request through a network toward said cache slice;
receiving a notice that a failure event has occurred for said cache slice; and
moving information cached within said cache slice to at least one other of said cache slices if a migration bit is enabled and flushing said cached information to a system memory if said migration bit is not enabled.

8. The method of claim 7 further comprising receiving a second request having said address, and directing said second request to said at least one other of said cache slices.

9. The method of claim 8 wherein said moving comprises moving said information evenly across each of a plurality of said cache slices other than said cache slice.

10. The method of claim 8 wherein said moving includes processing said address with a different hashing function.

11. The method of claim 7 further comprising determining, with software or firmware that acts in response to said notice of said failure event, that said at least one other of said cache slices is to receive said of information from said cache slice.

12. The method of claim 11 wherein said software or firmware writes or reads information to or from a register in response to receiving said notice.

13. A computing system, comprising:
a plurality of processing cores;
a display;
different instances of cache agent logic circuitry for respective cache slices of a distributed cache;
hash engine logic circuitry comprising:
hash logic circuitry to determine, based on an address, that a particular one of said cache slices is to receive a request having said address;
a first input to receive a notice of a failure event for said particular cache slice;
first circuitry to assign said address to another cache slice of said cache slices in response to said notice; and
migration logic circuitry to move, in response to said notice, cached information whose location within said particular cache slice is to be specified by said address from said particular cache slice to said another cache slice if a migration bit is enabled and flush said cached information to a system memory if said migration bit is not enabled.

14. The computing system of claim 13 comprising a network between said different instances of cache agent logic circuitry and said hash engine logic circuitry.

15. The computing system of claim 13 wherein said migration logic circuitry is coupled to said first circuitry, said first circuitry being second hash logic circuitry.

16. The computing system of claim 13 wherein said first circuitry is coupled to a register that receives an identity of said another cache slice from firmware or software that determines, in response to said notice of said failure event, that said another cache slice is an appropriate new cache slice for addresses targeted to said particular one of said cache slices.

17. The computing system of claim 13 further comprising a register coupled to said hash engine logic circuitry to store at least one of
an identity of said particular one of said cache slices; and
an identity of said another cache slice.

18. A semiconductor chip, comprising:
different instances of cache agent logic circuitry for respective cache slices of a distributed cache;
hash engine logic circuitry comprising:
hash logic circuitry to determine, based on an address, that a particular one of said cache slices is to receive a request having said address;
a first input to receive a notice of a failure event for said particular cache slice;
first circuitry to assign said address to another cache slice of said cache slices in response to said notice;
migration logic circuitry to move, in response to said notice, cached information whose location within said particular cache slice is specified by said address from said particular cache slice to said another cache slice if a migration bit is enabled and flush said cached information to a system memory if said migration bit is not enabled; and system management to suspend, in response to said notice, cache snoops to any cache slice during the move of said cached information from said particular cache slice to said another cache slice.

19. The semiconductor chip of claim 18 wherein said migration logic circuitry is to move said cached information evenly across a plurality of said another cache slices.

20. The semiconductor chip of claim 18 wherein said first circuitry is coupled to a register that receives an identity of said another cache slice from firmware or software that determines, in response to said notice of said failure event, that said another cache slice is an appropriate new cache slice for addresses targeted to said particular one of said cache slices.

21. A semiconductor chip, comprising:
different instances of cache agent logic circuitry for respective cache slices of a distributed cache;
hash engine logic circuitry comprising:
hash logic circuitry to determine, based on an address, that a particular one of said cache slices is to receive a request having said address;
a first input to receive a notice of a failure event for said particular cache slice;
first circuitry to assign said address to another cache slice of said cache slices in response to said notice;
migration logic circuitry to move, in response to said notice, cached information whose location within said particular cache slice is specified by said address from said particular cache slice to said another cache slice if a migration bit is enabled and flush said cached information to a system memory if said migration bit is not enabled; and
system management to disable, in response to said notice, a cache agent of said particular cache slice.

22. The semiconductor chip of claim 21 wherein said migration logic circuitry is to move said cached information evenly across a plurality of said another cache slices.

23. The semiconductor chip of claim 21 wherein said first circuitry is coupled to a register that receives an identity of said another cache slice from firmware or software that determines, in response to said notice of said failure event, that said another cache slice is an appropriate new cache slice for addresses targeted to said particular one of said cache slices.

24. The semiconductor chip of claim 21 wherein said system management is to disable, in response to said notice, said cache agent of said particular cache slice from issuing an additional system management interrupt or a machine check error event.

* * * * *